United States Patent
Nagai et al.

(10) Patent No.: US 9,318,923 B2
(45) Date of Patent: Apr. 19, 2016

(54) LAMINATED IRON CORE AND METHOD FOR MANUFACTURING SAME

(75) Inventors: Akira Nagai, Fukuoka (JP); Jin Oda, Fukuoka (JP)

(73) Assignee: MITSUI HIGH-TEC, INC., Fukuoka (JP)

( * ) Notice: Subject to any disclaimer, the term of this patent is extended or adjusted under 35 U.S.C. 154(b) by 319 days.

(21) Appl. No.: 13/992,287

(22) PCT Filed: Jan. 23, 2012

(86) PCT No.: PCT/JP2012/051299
§ 371 (c)(1),
(2), (4) Date: Jun. 7, 2013

(87) PCT Pub. No.: WO2012/105350
PCT Pub. Date: Aug. 9, 2012

(65) Prior Publication Data
US 2013/0249346 A1    Sep. 26, 2013

(30) Foreign Application Priority Data
Feb. 3, 2011  (JP) .................................. 2011-021901

(51) Int. Cl.
*H02K 1/06* (2006.01)
*H02K 1/12* (2006.01)
(Continued)

(52) U.S. Cl.
CPC .................. *H02K 1/12* (2013.01); *H02K 1/146* (2013.01); *H02K 1/148* (2013.01); *H02K 15/00* (2013.01); *H02K 15/022* (2013.01);
(Continued)

(58) Field of Classification Search
CPC .................................. H02K 1/146; H02K 1/12
USPC ............... 310/216.106, 216.048; 29/596, 598
See application file for complete search history.

(56) References Cited

U.S. PATENT DOCUMENTS 6,781,278 B2 *  8/2004  Liao .......................... 310/254.1
7,667,367 B2   2/2010  Matsuo et al.
(Continued)

FOREIGN PATENT DOCUMENTS

JP          9-191588       7/1997
JP          11-113195      4/1999
(Continued)

OTHER PUBLICATIONS

ISA 210 and 237 dated Apr. 17, 2012 (partial English translation).
(Continued)

*Primary Examiner* — Hanh Nguyen
(74) *Attorney, Agent, or Firm* — Greenblum & Bernstein, P.L.C.

(57) ABSTRACT

A laminated iron core and a method for manufacturing the same are provided to secure the lamination strength of the respective iron core pieces thereof, and to provide good magnetic efficiency and to reduce a loss. In a laminated iron core including a first caulking section formed in an area thereof having larger magnetic flux density than other area and a second caulking section formed in the other area, the engagement area A of the recessed sub-sections and projecting sub-sections of the first caulking sections of divided iron core pieces adjoining each other in the laminating direction is set smaller than the engagement area B of the recessed sub-sections and projecting sub-sections of the second caulking sections adjoining each other in the laminating direction.

10 Claims, 7 Drawing Sheets

(51) Int. Cl.
  *H02K 1/14* (2006.01)
  *H02K 15/02* (2006.01)
  *H02K 15/00* (2006.01)

(52) U.S. Cl.
  CPC ....... *H02K 2201/09* (2013.01); *H02K 2213/03* (2013.01); *Y10T 29/49009* (2015.01)

(56) References Cited

U.S. PATENT DOCUMENTS

| | | | |
|---|---|---|---|
| 8,048,509 B2* | 11/2011 | Fujita | 428/133 |
| 8,390,166 B2* | 3/2013 | Kobayashi | 310/216.048 |
| 2005/0077798 A1* | 4/2005 | Mitsui | 310/217 |
| 2008/0129141 A1* | 6/2008 | Sato | 310/217 |
| 2009/0026873 A1 | 1/2009 | Matsuo et al. | |
| 2011/0142696 A1* | 6/2011 | Kojima et al. | 417/410.1 |
| 2012/0058313 A1 | 3/2012 | Nagai et al. | |

FOREIGN PATENT DOCUMENTS

| | | |
|---|---|---|
| JP | 2006-314155 | 11/2006 |
| JP | 2008-36671 | 2/2008 |
| JP | 2008-113498 | 5/2008 |
| JP | 2008-206262 | 9/2008 |
| JP | 2008-259349 | 10/2008 |
| JP | 2010-233436 | 10/2010 |

OTHER PUBLICATIONS

China Office action, dated Feb. 28, 2015 along with an English translation thereof.

Japan Office action, dated Mar. 17, 2015 along with an English translation thereof.

* cited by examiner

# LAMINATED IRON CORE AND METHOD FOR MANUFACTURING SAME

TECHNICAL FIELD

The present invention relates to a laminated iron core to be formed by caulking and laminating iron core pieces of a given shape and a method for manufacturing the same.

BACKGROUND ART

There is known a laminated iron core used as the core or stator of a motor. As the laminated iron core, there is known a laminated iron core formed by laminating annular iron core pieces and mainly used in a small motor, or a laminated iron core formed by laminating multiple divided iron core pieces which are obtained by dividing an annular iron core piece (for example, see Patent Literatures 1 and 2).

The multiple iron core pieces or divided iron core pieces used in an ordinary laminated iron core respectively include a caulking portion which mechanically connects together iron core pieces or divided iron core pieces mutually adjoining in the laminating direction. Also, the divided iron core pieces constituting the laminated iron core disclosed in Patent Literatures 1 and 2 respectively include a larger number of caulking portions than the annular iron core pieces. Thus, the divided iron core pieces are connected together more firmly.

Figure 8A:
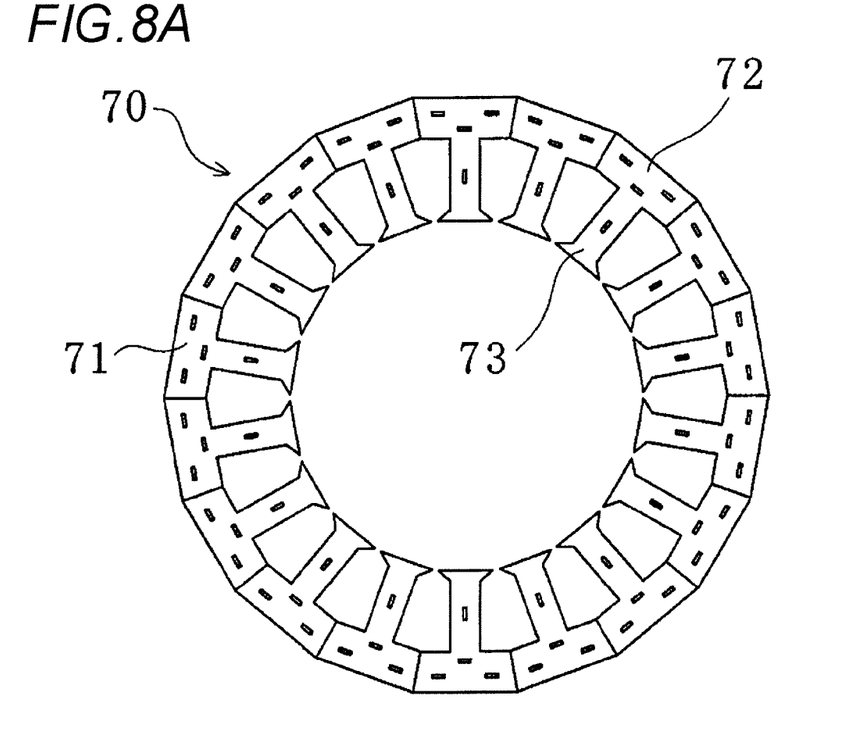
FIG. 8A is a plan view of a divided type laminated iron core used as the stator of a conventional inner rotor type motor.
Figure 8B:
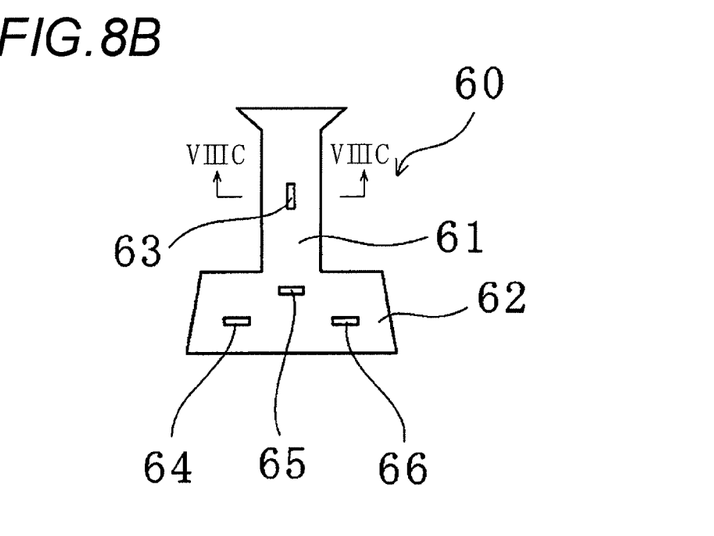
FIG. 8B is a plan view of a divided laminated iron core used in the laminated iron core shown in FIG. 8A.
Figure 8C:
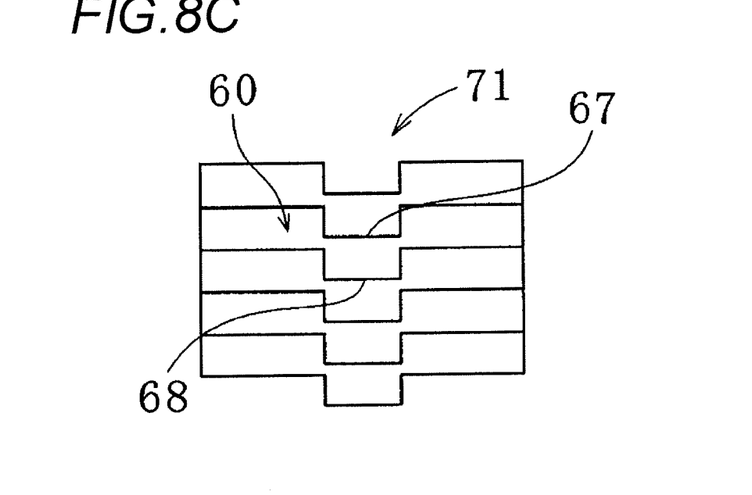
FIG. 8C is a sectional view taken along the VIIIC-VIIIC line shown in FIG. 8B.
Figure 8D:
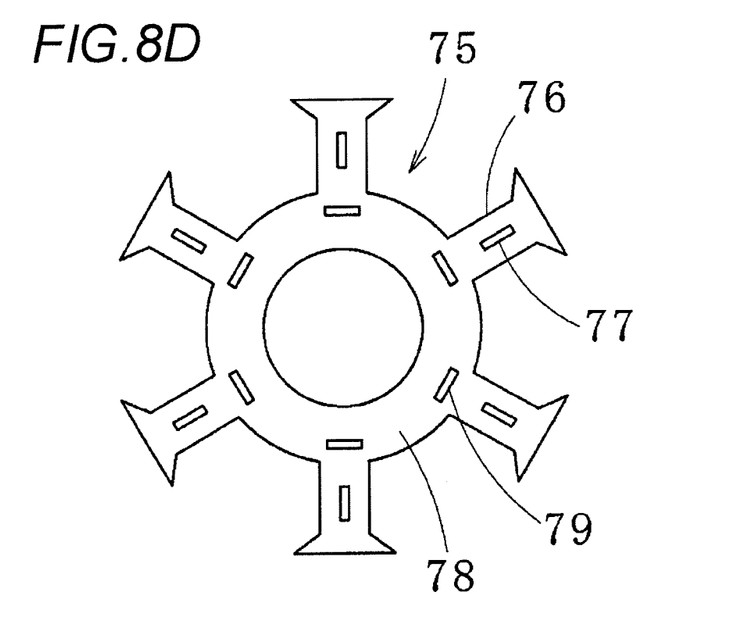
FIG. 8D is a plan view of a non-divided type laminated iron core used as the stator of a conventional outer-rotor type motor.

FIG. 8A is a plan view of a divided type of laminated iron core 70 used as the stator of a conventional inner-rotor type motor, FIG. 8B is a plan view of a divided laminated iron core 71 for use in the laminated iron core 70 shown in FIG. 8A, and FIG. 8C is a sectional view taken along the VIIIC-VIIIC line shown in FIG. 8B. Also, FIG. 8D is a plan view of a non-divided type of laminated iron core 75 used as the stator of a conventional outer-rotor type motor.

As shown in FIG. 8A and FIG. 8B, the laminated iron core 70 used as the stator of the inner-rotor type motor is structured by combining together multiple divided laminated iron cores 71, while the divided laminated iron core 71 is structured by laminating multiple divided iron core pieces 60. The divided iron core piece 60 includes a magnetic pole shaft piece 61 and a divided yoke portion 62. The divided yoke portion 62 forms a portion of the annular yoke portion 72 of the laminated iron core 70, while the magnetic pole shaft piece 61 forms a magnetic pole shaft portion 73 projecting from the yoke portion 72 toward the inner periphery of the laminated iron core 70.

In this divided iron core piece 60, the magnetic pole shaft piece 61 includes a caulking section 63, while the divided yoke portion 62 includes three caulking sections 64, 65 and 66. These caulking sections 63, 64, 65 and 66 are the same in size and shape.

The caulking sections 63, 64, 65 and 66, as shown in FIG. 8C, are formed to project toward one side in the laminating direction; and, each caulking section includes a projecting sub-section 68 on one side in the laminating direction and a recessed sub-section 67 on the other side in the laminating direction. The projecting sub-sections 68 of the caulking sections 63, 64, 65 and 66 are fitted into the recessed sub-sections 67 of the divided iron core pieces 60 situated on one side in the laminating direction, whereby the divided iron core pieces 60 mutually adjoining in the laminating direction are connected to each other.

Also, as shown in FIG. 8D, similarly in the non-divided type of laminated iron core 75 used as the stator of the outer-rotor type motor, the magnetic pole shaft pieces 76 and yoke pieces thereof respectively include caulking sections 77, 79 which are the same in size and shape.

CITATION LIST

Patent Literature

Patent Literature 1: JP-A-2008-113498
Patent Literature 2: JP-A-2008-206262

SUMMARY OF INVENTION

Technical Problem

Here, since the projecting sub-sections 68 of the caulking portions 63, 64, 65 and 66 are engaged into the recessed sub-sections 67, a conduction circuit is formed in the divided iron core pieces 60 mutually adjoining in the laminating direction. Since this conduction circuit is perpendicular to the direction of the magnetic flux of the laminated iron core 70, this conduction circuit produces an eddy current in the divided iron core pieces 60, whereby an eddy current loss is generated.

As described above, since the caulking sections 63, 64, 65 and 66 having the same size and shape are formed in the conventional laminated iron core 70, especially in the high magnetic flux density area thereof, there is a possibility that the eddy current generated can be large. This generates an excessive eddy current loss, which incurs the loss of electric power and also raises an increase in the temperature of the laminated iron core. Also, formation of the caulking sections 63, 64, 65 and 66 reduces an area through which the magnetic flux of the divided iron core pieces transmits, whereby the magnetic flux density of the iron core piece approaches its saturation magnetic flux density, raising a fear that the laminated iron core 70 cannot generate its true electromagnetic power.

The present invention is developed in view of the above. Thus, it is an object of the present invention to provide a laminated iron core which can secure the lamination strength of the respective iron core pieces thereof, can provide good magnetic efficiency and can reduce a loss, and a method for manufacturing the same.

Solution to Problem

In order to achieve the object, the present invention provides a laminated iron core, including: multiple iron core pieces caulked and laminated on each other; a first caulking section formed in an area of each of the iron core pieces where a density of magnetic flux passing therethrough is larger than in other area; and a second caulking section formed in the other area of the iron core piece, wherein an engagement area A of the first caulking section of the iron core piece mutually adjoining in a lamination direction is smaller than an engagement area B of the second caulking section mutually adjoining in the laminating direction.

According to the present invention, the laminated iron core may be also configured so that each of the first and second caulking sections has a rectangular shape when viewed from above, and each of the first and second caulking sections has a V shape including a bottom portion and two inclined portions opposed to each other across the bottom portion.

According to the present invention, the laminated iron core may be also configured so that a longitudinal direction of the first caulking section faces a direction of the magnetic flux.

According to the present invention, the laminated iron core may be also configured so that a caulking depth of the first caulking section is smaller than a caulking depth of the second caulking section, whereby the engagement area A of the first caulking section is set smaller than the engagement area B of the second caulking section.

According to the present invention, the laminated iron core may be also configured so that a shape of the first caulking section is formed smaller than a shape of the second caulking section, whereby the engagement area A of the first caulking section is set smaller than the engagement area B of the second first caulking section.

According to the present invention, the laminated iron core may be also configured so that a thickness of the first caulking section is set smaller than a thickness of the second caulking section, whereby the engagement area A of the first caulking section is set smaller than the engagement area B of the second first caulking section.

Further, in order to achieve the object, the present invention provides a method for manufacturing a laminated iron core, including the steps of: forming a first caulking section to be formed in an area of each of iron core pieces where a density of magnetic flux passing therethrough is higher than in other area, and a second caulking portion to be formed in the other area; and thereafter, laminating the iron core pieces on each other through the first and second caulking sections, wherein an engagement area A of the first caulking section of each of the iron core pieces mutually adjoining in a laminating direction is set smaller than an engagement area B of the second first caulking section of each of the iron core pieces mutually adjoining in the lamination direction.

According to the present invention, the method for manufacturing the laminated iron core may be also configured so that the area where the first caulking section is formed is previously coined and a coined portion is thereby formed smaller in thickness than other portion.

Advantageous Effects of Invention

In a laminated iron core and a method for manufacturing the same according to the present invention, the engagement area A of the first caulking sections formed in the area where the density of magnetic flux passing therethrough is higher than the other area is set smaller than the engagement area B of the second caulking sections formed in the other area. This can reduce an eddy current flowing in iron core pieces to be laminated to thereby reduce a loss caused in the laminated iron core and also can prevent the magnetic flux density of the laminated iron core from reaching its saturation state. Also, the first caulking section and second caulking section can maintain the lamination strength of the laminated iron core sufficiently.

MODES FOR CARRYING OUT INVENTION (First embodiment)

Figure 1:
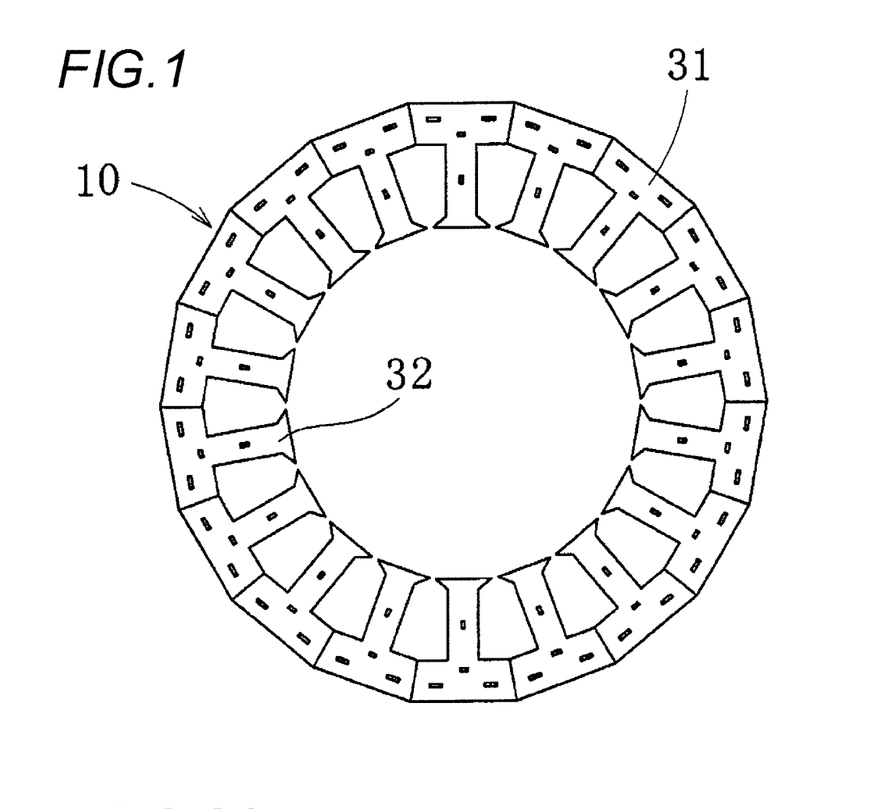
FIG. 1 is a plan view of a laminated iron core according to a first embodiment of the present invention.
Figure 2A:
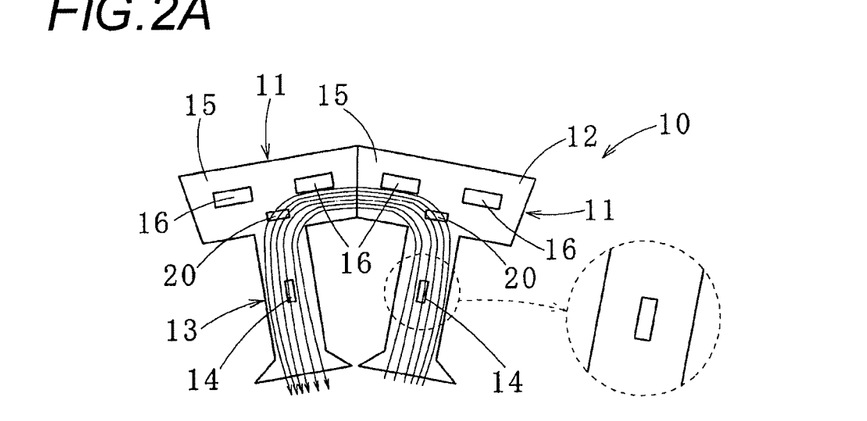
FIG. 2A is a plan view of two sets of divided laminated iron cores constituting the laminated iron core shown in FIG. 1.
Figure 2B:
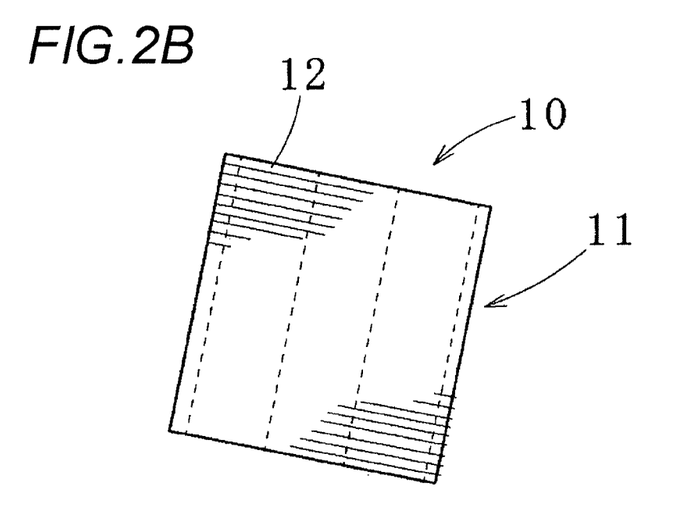
FIG. 2B is a side view of the divided laminated iron core shown in FIG.. 2A.

Now, description is given of a laminated iron core 10 according to a first embodiment of the present invention with reference to FIGS. 1, 2A and 2B. FIG. 1 is a plan view of the laminated iron core 10.

The laminated iron core 10 of the first embodiment of the present invention is a divided type annular laminated iron core used as the stator of an inner-rotor type motor. The laminated iron core 10 includes an annular yoke portion 31 and a magnetic pole shaft portion 32 projecting from the yoke portion 31 toward the inner periphery thereof. A winding wire (not shown) is wound on the magnetic pole shaft portion 32.

As shown in FIG. 1, the annular laminated iron core 10 is constituted by combining together multiple sets of divided laminated iron cores 11 having the same shape in an annular shape. FIG. 2A is a plan view of the divided laminated iron core 11 and FIG. 2B is a side view of the divided laminated iron core 11.

As shown in FIG. 2B, the divided laminated iron core 11 is constituted of multiple divided iron core pieces 12 having the same shape which have been laminated on and caulked to each other. As shown in FIG. 2A, the divided iron core piece 12 is a metal piece having a substantially T-like shape. Each divided iron core piece 12 includes a divided yoke piece 15 constituting part of the yoke portion 31 and a magnetic pole shaft piece 13 constituting part of the magnetic pole shaft portion 32.

By supplying electricity to the winding wire wound on the magnetic pole shaft portion 32 from outside, there is generated a magnetic line of force in the magnetic pole shaft portion 32. When electricity is supplied to the winding wire, there are generated magnetic lines of force going in the opposite directions in the mutually adjoining magnetic pole shaft portions 32. The magnetic lines of force generated in the magnetic pole shaft portion 32, as shown in FIG. 2A, are connected through the divided yoke piece 15 to the magnetic line of force generated in the adjoining magnetic pole shaft piece 13, thereby forming a magnetic circuit.

The magnetic pole shaft piece 13 includes a first caulking section 14. And, the divided yoke piece 15 also includes a second caulking section 16. Also, a third caulking section 20 is formed in the boundary portion between the magnetic pole shaft piece 13 and divided yoke piece 15.

The first caulking section 14, the second caulking section 16 and the third caulking section 20 can be formed, for example, by press molding the divided iron piece 12 of a metal plate. After the divided iron core pieces 12 are laminated on each other, the first caulking sections 14, the second caulking sections 16 and the third caulking sections 20 thereof adjoining in the laminating direction are caulked to each other, whereby they are connected together to constitute the divided laminated iron core 11.

Figure 3A:
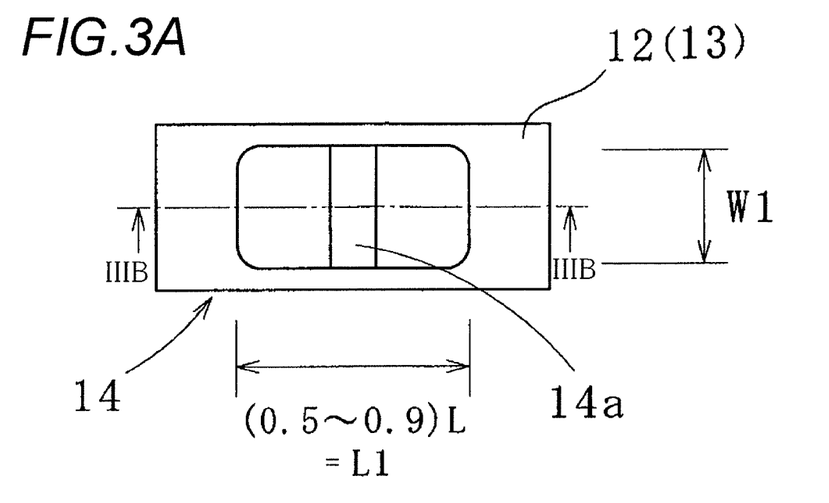
FIG. 3A is a plan view of a first caulking section.
Figure 3B:
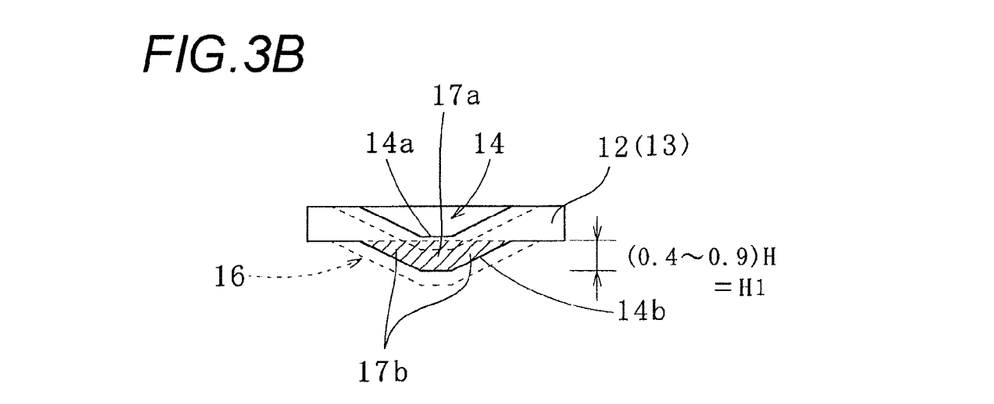
FIG. 3B is a sectional view of the caulking section shown in FIG. 3A, taken along the IIIB-IIIB line.

FIG. 3A is a plan view of the first caulking section 14. FIG. 3B is a sectional view taken along the IIIB-IIIB line shown in FIG. 3A, while a broken line shows the section of the second caulking section 16. Also, FIG. 4A is a plan view of the second caulking section 16, and FIG. 4B is a sectional view taken along the IVB-IVB line shown in FIG. 4A.

Figure 4A:
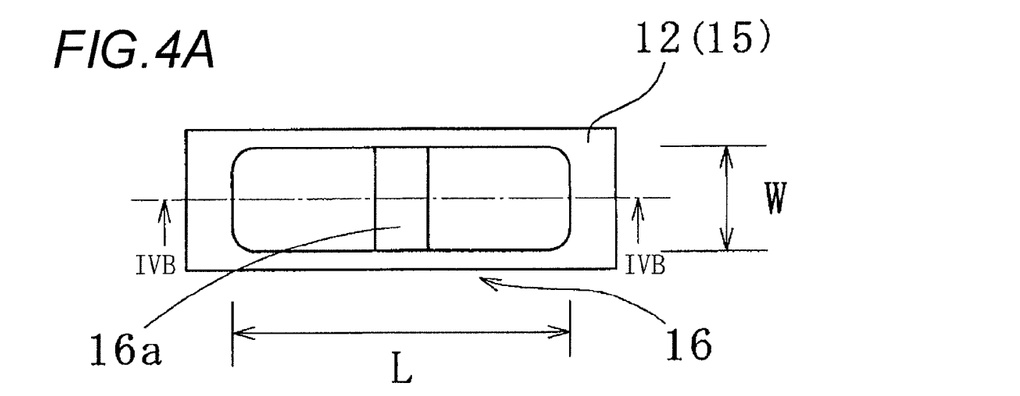
FIG. 4A is a plan view of a second caulking section.

As shown in FIG. 3A and FIG. 4A, the first caulking section 14 and the second caulking section 16 are respectively formed to have a rectangular shape when viewed from above. Also, as shown in FIGS. 3B and 4B, the section thereof has a V-like shape including bottom portions 17a, 18a and inclined portions 17b, 18b facing each other across the bottom portions 17a, 18a.

The first caulking section 14 includes a recessed sub-section 14a in its upper surface and a projecting sub-section 14b on its lower surface. Also, the second caulking section 16, similarly, includes a recessed sub-section 16a in its upper surface and a projecting sub-section 16b on its lower surface. The projecting sub-section 14b of the first caulking section 14 has a shape corresponding to the recessed sub-section 14a, while the projecting sub-section 14b of a divided iron core piece adjoining in the laminating direction is engaged into the recessed sub-section 14a and is then caulked. In the second caulking section 16, similarly, the projecting sub-section 16b of the second caulking section 16 is engaged into the recessed sub-section 16a and is then caulked.

Figure 4B:
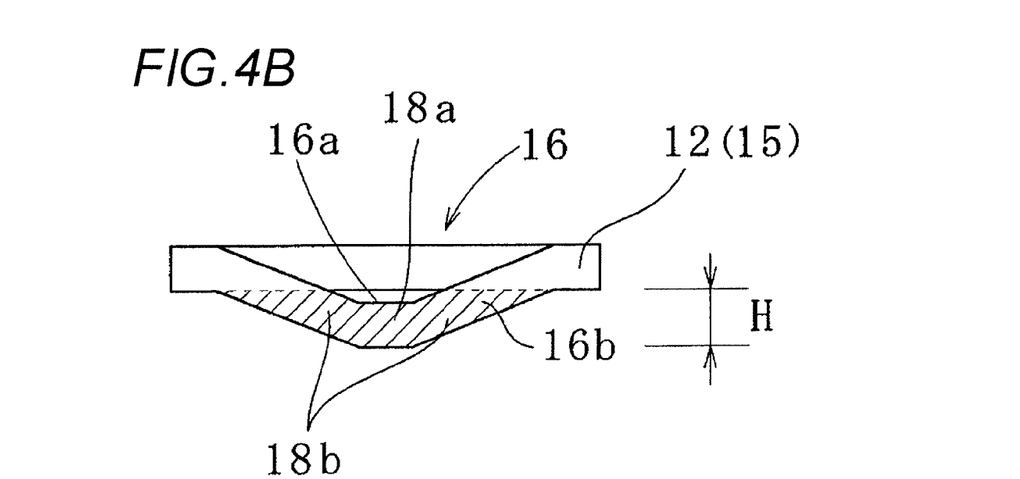
FIG. 4B is a sectional view of the caulking section shown in FIG. 4A, taken along the IVB-IVB line.

As shown in FIG. 4A and FIG. 4B, the length of the second caulking section 16 in the longitudinal-direction when viewed from above is expressed as L, the width thereof as W and the projecting height of the projecting sub-section 16b from the lower surface of the divided iron core piece 12 as H. And, as shown in FIG. 3A and FIG. 3B, the longitudinal-direction length L1 of the first caulking section 14 is set shorter than the length L of the second caulking section 16, for example, L1=0.5 to 0.9 L. Also, the projecting height (caulking depth) H1 of the projecting sub-section 14b of the first caulking section 14 from the lower surface of the divided iron core piece 12 is also set smaller than the projecting height H of the projecting sub-section 16b of the second caulking section 16, for example, 0.4 H to 0.9 H.

Here, hatched areas in FIG. 3B and FIG. 4B respectively show the shapes of the cross sections of the projecting sub-sections 14b and 16b projecting from the lower surface of the divided iron core pieces 12. Since the respective projecting sub-sections 14b and 16b are engaged into their associated recessed sub-sections 14a and 16a and are then caulked, the divided iron core pieces 12 mutually adjoining in the laminating direction are contacted with each other in the cross sections of the projecting sub-sections 14b and 16b. Therefore, an eddy current is allowed to flow in the divided iron core pieces 12 mutually adjoining in the laminating direction.

However, according to the laminated iron core 10 of this embodiment, as described above, the length L1 of the first caulking section 14 is shorter than the length L of the second caulking section 16 and the caulking depth H1 of the first caulking section 14 is smaller than the caulking depth H of the second caulking section 16. Therefore, the engagement area A between the recessed sub-section 14a and projecting sub-section 14b of the first caulking section 14 is smaller than the engagement area B between the recessed sub-section 16a and projecting sub-section 16b of the second caulking section 16.

More specifically, in this embodiment, the engagement area A of the first caulking section 14 is about 0.3 to 0.81 times the engagement area B of the second caulking section 16. This reduces the amount of the eddy current generated between the divided iron core pieces 12 mutually adjoining in the laminating direction.

Here, if the engagement area A of the first caulking section 14 is less than 0.3 times the engagement area B of the second caulking section 16, a connecting force obtained in the first caulking section 14 is insufficient. Therefore, in the case that the mutual connecting force between the divided iron core pieces 12 is satisfied only by the second caulking section 16, the fastening force of the second caulking section 16 is excessively strong, thereby raising a fear that the divided iron core pieces 12 can be deformed. Also, if the engagement area A exceeds 0.81 times, the eddy current reducing effect is hardly expected.

Also, in the case of the magnetic flux density passing through the divided iron core pieces 12, since the winding wire is wound on the periphery of the magnetic pole shaft piece 13, the magnetic flux density of the divided yoke piece 15 is smaller than the magnetic flux density of the magnetic pole shaft piece 13. Therefore, the absolute amount of an eddy current loss generated in the second caulking section 16 formed in the divided yoke piece 15 is smaller than an eddy current loss generated in the caulking section 14 formed in the magnetic pole shaft piece 13. Thus, while the caulking strength of the divided yoke piece 15 is taken into prior consideration, the second caulking section 16 may be also formed rather large. On the contrary, since the magnetic flux density of the magnetic pole shaft piece 13 is large, with the eddy current loss taken into consideration, as described above, the first caulking section 14 is formed smaller than the second caulking section 16.

Also, since the winding wire is wound along the periphery of the magnetic pole shaft piece 13 in the longitudinal direction, the direction of the magnetic flux coincides with the longitudinal direction of the magnetic pole shaft piece 13. The longitudinal direction of the first caulking section 14 also coincides with the direction of the magnetic flux passing through the magnetic pole shaft piece 13. This prevents the first caulking portion 14 from crossing the magnetic flux passing through the magnetic pole shaft piece 13 as much as possible, whereby the magnetic flux density in the magnetic pole shaft piece 13 is hard to reach its saturation magnetic flux density. Therefore, according to the laminated iron core 10 of this embodiment, since the magnetic flux density is hard to reach the saturation magnitude flux density, the laminated iron core 10 can output the electromagnetic force of its inherent magnitude.

Here, in order to reduce magnetic resistance, the width W1 of the first caulking section 14 may be also set smaller than the width W of the second caulking section 16 formed in the divided yoke piece 15. In this case, 0.5 W<W1<0.95 W is preferred. Since the width W1 of the first caulking section 14 is set small, the section area of the first caulking section 14 is reduced crossing at right angles the direction of the magnetic flux passing through the magnetic pole shaft piece 13. As a result, the section area of the magnetic pole shaft piece 13 becomes relatively larger, thereby being able to reduce the magnetic flux density of the magnetic flux passing through the magnetic pole shaft piece 13. This makes it hard for the magnetic flux to reach the saturation magnetic flux density.

In this embodiment, a third caulking section 20 is formed in the boundary portion between the magnetic pole shaft piece 13 and divided yoke piece 15. This third caulking section 20 is formed such that its longitudinal direction coincides with the longitudinal direction of the second caulking section 16. Thus, the third caulking section 20 is formed such that it does not cross the magnetic flux passing through the neighborhood of the third caulking section 20. That is, the longitudinal direction of the third caulking section 20 is set in a direction where the magnetic resistance of the third caulking section 20 reduces.

Alternatively, when the third caulking section 20 is formed on the magnetic pole shaft piece 13 side, it has the same direction as the first caulking section 14 and has a smaller shape. Also, when the third caulking section 20 is formed within the divided yoke piece 15, it has the same shape as the second caulking section 16 and its longitudinal direction is set toward a direction where the magnetic resistance reduces.

(Second embodiment)

Figure 5A:
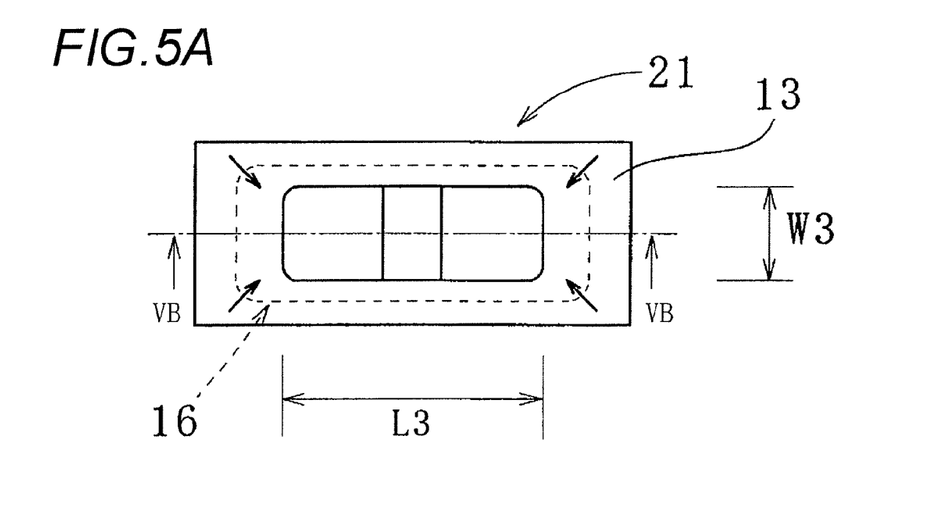
FIG. 5A is a plan view of a first caulking section of a laminated iron core according to a second embodiment of the present invention.
Figure 5B:
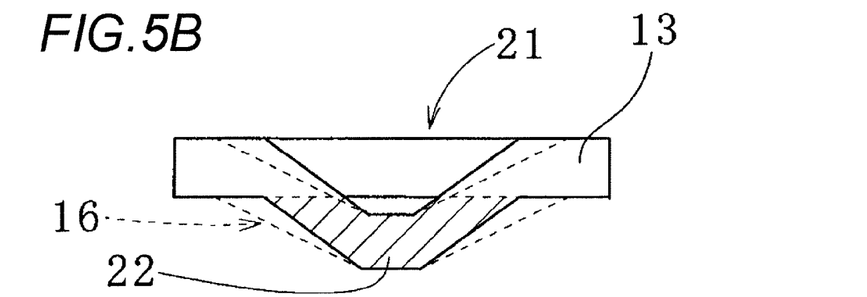
FIG. 5B is a sectional view of the first caulking section shown in FIG. 5A, taken along the VB-VB line.

FIG. 5A is a plan view of a first caulking section 21 formed in the magnetic pole shaft piece 13 of a laminated iron core 10 according to a second embodiment of the present invention, and FIG. 5B is a sectional view taken along the VB-VB line shown in FIG. 5A. Here, in FIGS. 5A and 5B, a broken line shows a second caulking section 16 formed in a divided yoke piece 15.

As shown in FIG. 5A and FIG. 5B, the width W3 and longitudinal direction length L3 of the first caulking section 21 are set smaller than the width W and length L of the second caulking section 16 (see FIGS. 4A and 4B). Also, the height of the projecting sub-section 22 of the first caulking section 21 is set equal to the height H of the second caulking section 16. Here, preferably, the width W3 of the first caulking section 21 may be W3=(0.4 to 0.9) W and the length L3 of the first caulking section 21 may be L3=(0.4 to 0.9) L.

Thus, according to the laminated iron core 10 of the second embodiment, since the width W3 and length L3 of the first caulking section 21 are set small, the caulking force obtained by the first caulking section 21 is somewhat reduced. However, since the engagement area A of the first caulking section 14 is greatly smaller than the engagement area B of the second caulking section 16, the laminated iron core 10 having a small eddy current loss can be obtained.

(Third embodiment)

Figure 6A:
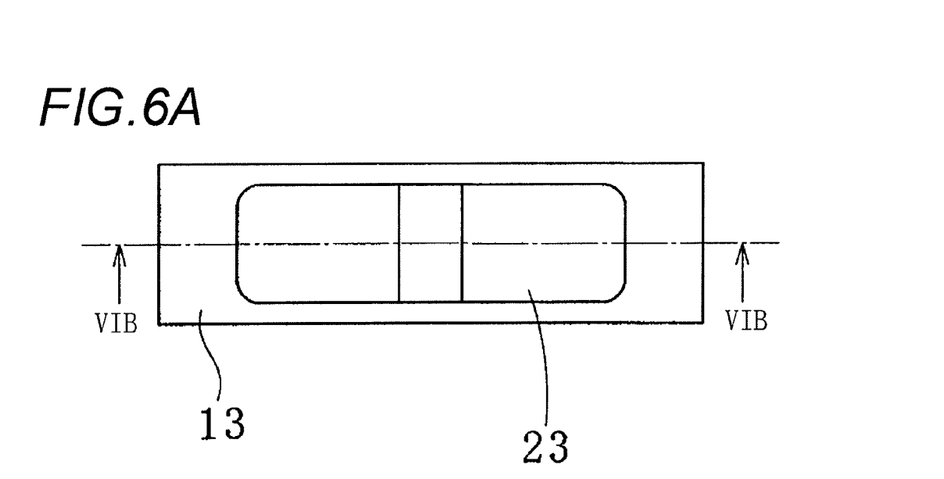
FIG. 6A is a plan view of a first caulking section of a laminated iron core according to a third embodiment of the present invention.
Figure 6B:
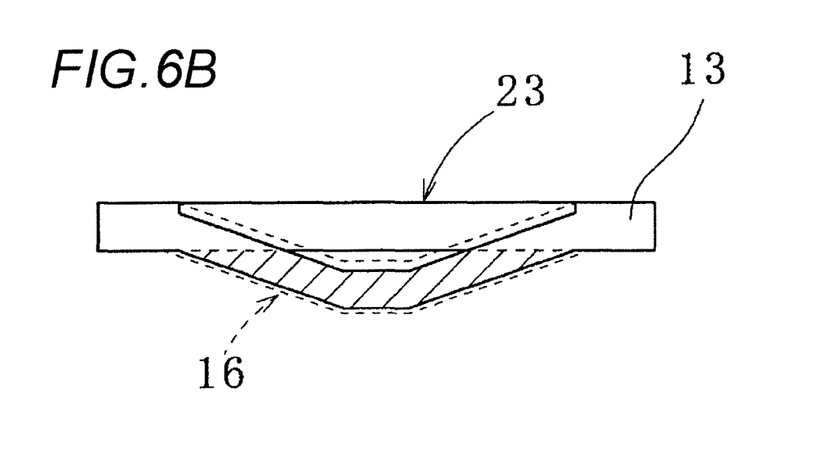
FIG. 6B is a sectional view of the caulking section shown in FIG. 6A, taken along the VIB-VIB line.

FIG. 6A is a plan view of a first caulking section 23 formed in the magnetic pole shaft piece 13 of a laminated iron core 10 according to a third embodiment of the present invention. FIG. 6B is a sectional view taken along the VIB-VIB line shown in FIG. 6A.

The area of the laminated iron core 10 of this embodiment, where the first caulking section 23 is to be formed, is coined to have a small thickness before the first caulking section 23 is press formed in the divided iron core piece 12. And, after the thickness of the first caulking section 23 forming area is reduced, the first caulking section 23 and second caulking section 16 are formed.

Thus, the thickness of the first caulking section 23 is set thinner than the second caulking section 16, while its engagement area A with the first caulking section 23 of the divided iron core piece 12 adjoining in the laminating direction is approximately 0.4 to 0.81 times the engagement area B of the second caulking section 16. This reduces an eddy current which is generated between the mutually adjoining divided iron core pieces 12.

EXAMPLES

Next, description is given of examples conducted to confirm the operation and effects of this invention.

Multiple caulking sections having the same shape and having a depth of 0.22 mm were formed in each of iron core pieces of a plate thickness of 0.3 mm, and the multiple iron core pieces were laminated and combined together to thereby produce a conventional laminated iron core. The iron loss value of this conventional laminated iron core was 5.6 W.

On the other hand, in an example 1, there was produced a laminated iron core in which a first caulking section having a caulking depth of 0.119 mm was formed in a magnetic pole shaft piece where much magnetic flux flows and a second caulking section having a caulking depth of 0.22 mm was formed in a divided yoke piece. The iron loss value of the laminated iron core according to the example 1 was 5.1 W, which shows that the iron loss value could be reduced when compared with the conventional laminated iron core.

Also, in an example 2, using iron core pieces each having a plate thickness of 0.3 mm, there was produced a laminated iron core which a first caulking section having a caulking depth of 0.06 mm was formed in a magnetic pole shaft piece and a second caulking section having a caulking depth of 0.22 mm is formed in a divided yoke piece. The iron loss value of this laminated iron core was 4.7 W, which shows that the iron loss value could be reduced more than in the laminated iron core of the example 1.

Figure 7:
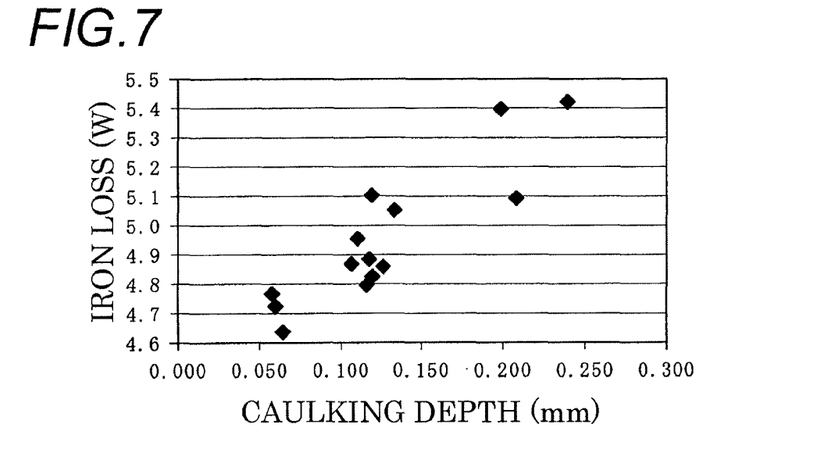
FIG. 7 is a graphical representation of the relationship between the caulking depth and iron loss of the caulking section.

Further, there were produced 12 pieces of laminated iron cores in which second caulking sections respectively having a constant caulking depth of 0.22 mm were formed in divided yoke pieces and first caulking sections respectively having caulking depths of 0.065 to 0.239 mm were formed in magnetic pole shaft pieces; and, the iron loss values thereof were measured. The measurement results including the examples 1 and 2 are shown in Table 1 and FIG. 7. FIG. 7 is a graph to show the relationship between the caulking depths of the first caulking sections and iron loss values.

As shown in FIG. 7, it was confirmed that, when the caulking depth was reduced, the iron loss value of the laminated iron core could be reduced. Here, when the caulking depth of the caulking section is set smaller than 0.05 mm, the strength and shape quality (parallelism, perpendicularity and the like) required of the laminated iron core are impaired. Therefore, the caulking depth may preferably be 0.05 mm or more.

TABLE 1

| Iron loss (W) | 5.1 | | 5.4 | | 5.4 | | 4.8 | 4.8 | | 5.1 |
|---|---|---|---|---|---|---|---|---|---|---|
| Resistance (mΩ) | 70.1 | | 35.0 | | 49.9 | | 85.6 | 171.9 | | 63.5 |
| Caulking depth (mm) | 0.208 | | 0.239 | | 0.198 | | 0.119 | 0.116 | | 0.119 |
| Iron loss (W) | 4.9 | 5.0 | | 4.9 | | 4.9 | 5.0 | 4.8 | 4.6 | 4.7 |
| Resistance (mΩ) | 124.1 | 57.9 | | 57.8 | | 44.8 | 53.6 | 75.6 | 59.3 | 46.8 |
| Caulking depth (mm) | 0.106 | 0.11 | | 0.126 | | 0.117 | 0.133 | 0.058 | 0.065 | 0.06 |

Although the present invention has been described heretofore with reference to the laminated iron cores according to the first to third embodiments thereof, the present invention is not limited to these embodiments. For example, the caulking sections described in the first to third embodiments may be combined together to thereby constitute a laminated iron core. Also, although the above embodiments have been described with reference to the V-shaped caulking section having a bottom portion and an inclined portion, the shape of the caulking section is not limited to the V shape but, for example, the caulking section may have a V shape constituted of only two mutually opposed inclined portions without including a bottom portion, or may have a shape including a projecting portion which projects in an arc manner.

Also, in the above embodiments, description has been given of an example in which a magnetic pole shaft piece is used as an area having high magnetic flux density, and a divided yoke piece is used as an area having low magnetic flux density, while a first caulking section is formed in the magnetic pole shaft piece and a second caulking section is formed in the divided yoke piece. However, the present invention is not limited this example. For example, in a laminated iron core used in a small motor, the boundary portion between the divided yoke piece and magnetic pole shaft piece has high magnetic flux density. Thus, a first caulking section smaller than a second caulking section formed in the other area may be formed in this boundary portion.

Also, in the above embodiments, description has been given with reference to the divided type of laminated iron core. However, the present invention can be also applied to a non-divided type of laminated iron core which can be produced by laminating annular iron core pieces on each other. For example, in the annular iron core piece, a first caulking section may be formed in a magnetic pole shaft piece having high magnetic flux density, a second caulking section may be formed in an annular yoke portion having low magnetic flux density, and the engagement area of the first caulking section may be set smaller than the engagement area of the second caulking section.

Although description has been given heretofore of the present invention in detail and with reference to the specific embodiments, it is obvious to persons skilled in the art that various changes and modifications can be also added without departing from the spirit and scope of the present invention.

The present application is based on Japanese patent application (Patent Application No. 2011-21901) filed on Feb. 3, 2011, the contents of which are incorporated herein by reference.

INDUSTRIAL APPLICABILITY

According to a laminated iron core of the present invention, since an eddy current flowing in laminated iron core pieces is small, a laminated iron core having a small eddy current loss can be provided. Also, since the magnetic flux density of the laminated iron core can be made hard to reach saturation magnetic flux density, more powerful electromagnetic force can be provided. Further, the first and second caulking sections can provide a laminated iron core having high lamination strength.

REFERENCE SIGNS LIST

10: Laminated iron core
11: Divided laminated iron core
12: Divided iron core piece
13: Magnetic pole shaft piece
14: First caulking section
14a: Recessed sub-section
14b: Projecting sub-section
15: Divided yoke piece
16: Second caulking section
16a: Recessed sub-section
16b: Projecting sub-section
20: Third caulking section
21: First caulking section

The invention claimed is:

1. A laminated iron core, comprising:
multiple iron core pieces caulked and laminated on each other, each iron core piece including a yoke piece and a magnetic pole shaft piece projecting from an inner periphery of the yoke piece;
a first caulking section provided in an area of each of the iron core pieces where a density of magnetic flux passing therethrough is larger than in another area; and
a second caulking section provided in the other area of the iron core piece, wherein
the first caulking section and the second caulking section are provided in the yoke piece,
a longitudinal direction of the first caulking section coincides with a longitudinal direction of the second caulking section, and
an engagement area A of the first caulking section of the iron core piece mutually adjoining in a lamination direction is smaller than an engagement area B of the second caulking section mutually adjoining in the laminating direction.

2. The laminated iron core according to claim 1, wherein
each of the first and second caulking sections has a rectangular shape when viewed from above, and
each of the first and second caulking sections has a V shape including a bottom portion and two inclined portions opposed to each other across the bottom portion.

3. The laminated iron core according to claim 2, wherein
a longitudinal direction of the first caulking section faces a direction of the magnetic flux.

4. The laminated iron core according to claim 2, wherein
a thickness of the first caulking section is set smaller than a thickness of the second caulking section, whereby the engagement area A of the first caulking section is set smaller than the engagement area B of the second first caulking section.

5. The laminated iron core according to claim 1, wherein
a caulking depth of the first caulking section is smaller than a caulking depth of the second caulking section, whereby the engagement area A of the first caulking section is set smaller than the engagement area B of the second caulking section.

6. The laminated iron core according to claim 1, wherein
a shape of the first caulking section is provided smaller than a shape of the second caulking section, whereby the engagement area A of the first caulking section is set smaller than the engagement area B of the second first caulking section.

7. The laminated iron core according to claim 1, wherein
the laminated iron core includes a plurality of divided laminated iron cores, which are annularly combined.

8. A method for manufacturing a laminated iron core, comprising:
providing a first caulking section in an area of each of iron core pieces where a density of magnetic flux passing therethrough is higher than in another area, and a second caulking portion in the other area; and laminating the iron core pieces on each other through the first and second caulking sections, wherein
  each iron core piece includes a yoke piece and a magnetic pole shaft piece projecting from an inner periphery of the yoke piece,
  the first caulking section and the second caulking section are provided in the yoke piece,
  a longitudinal direction of the first caulking section coincides with a longitudinal direction of the second caulking section, and
  an engagement area A of the first caulking section of each of the iron core pieces mutually adjoining in a laminating direction is set smaller than an engagement area B of the second caulking section of each of the iron core pieces mutually adjoining in the lamination direction.

9. The method for manufacturing the laminated iron core according to claim 8, wherein
  the area where the first caulking section is provided is previously coined and a coined portion is thereby provided smaller in thickness than other portion.

10. The method for manufacturing the laminated iron core according to claim 8, wherein the laminated iron core includes a plurality of divided laminated iron cores, which are annularly combined.

\* \* \* \* \*